United States Patent [19]
Ducanis

[11] 4,000,797
[45] Jan. 4, 1977

[54] NOISE-ABSORBING BAR STOCK GUIDE FOR SCREW MACHINE

[76] Inventor: Paul Ducanis, 17401 NW. 2nd Ave., Miami Shores, Fla. 33169

[22] Filed: June 2, 1975

[21] Appl. No.: 582,678

[52] U.S. Cl. .............. 193/38; 10/162 R; 82/38 A; 226/187; 226/189

[51] Int. Cl.² ............ B23B 25/00; B23Q 3/00

[58] Field of Search ............ 193/2 R, 35 R, 35 B, 193/38, 25 R, 25 S; 82/38 A, DIG. 9, 2.5, 2.7; 214/1.1, 1.2, 1.3, 1.4, 1.5, 338; 181/33 M; 226/186, 187, 189; 269/287; 10/162 R; 227/78, 80; 254/190 R; 308/3 R, 3 A, 3.8, 3.9, 4 R, 6 R, 6 A, 6 B

[56] References Cited

UNITED STATES PATENTS

| | | | |
|---|---|---|---|
| 2,187,405 | 1/1940 | Smethers | 226/187 X |
| 2,909,393 | 10/1959 | Price et al. | 308/4 R |
| 3,258,990 | 7/1966 | Bratz | 308/6 B X |
| 3,344,682 | 10/1967 | Bratz | 308/6 B X |
| 3,828,630 | 8/1974 | Argereu | 214/1.5 X |

Primary Examiner—Robert W. Saifer
Assistant Examiner—James L. Rowland
Attorney, Agent, or Firm—Oltman and Flynn

[57] ABSTRACT

The present arrangement for guiding bar stock being fed to a screw machine has yieldably-mounted rollers which project into a rotatable guide tube to guide the rotatable bar stock between them. The yieldable, resilient mounting of these rollers substantially eliminates noise and absorbs the transverse forces acting on the bar stock. Preferably, several sets of such rollers are provided at different locations along the length of the guide tube.

9 Claims, 18 Drawing Figures

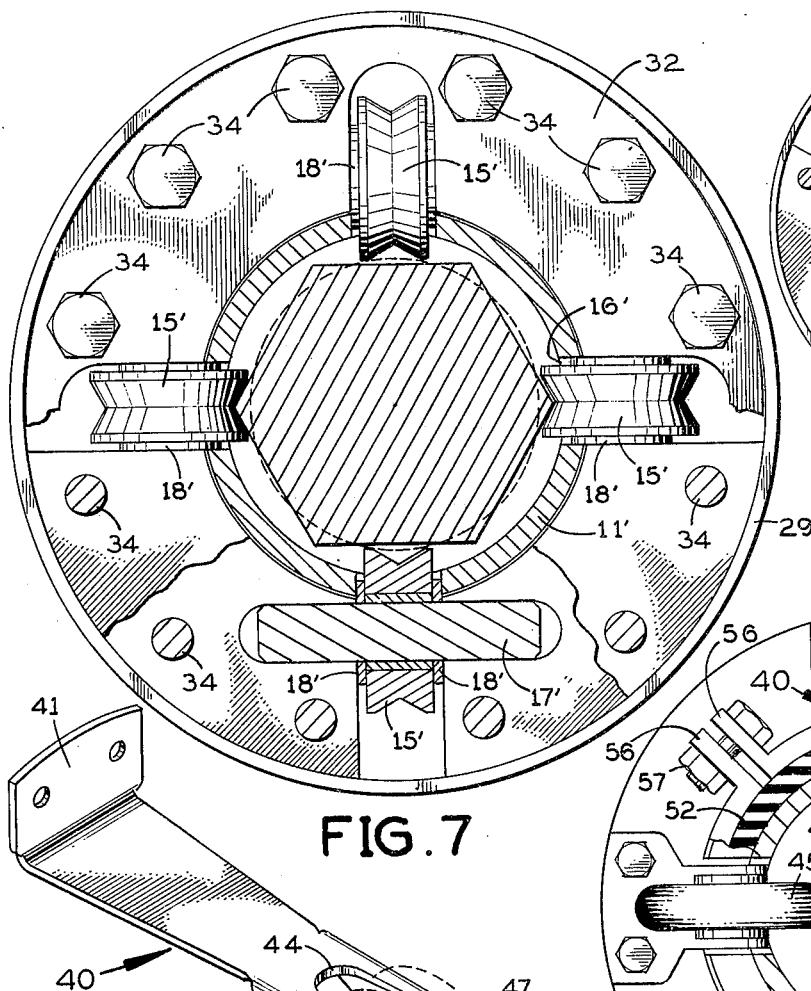
FIG. 7
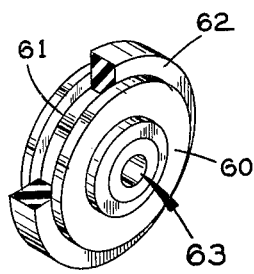
FIG. 7a
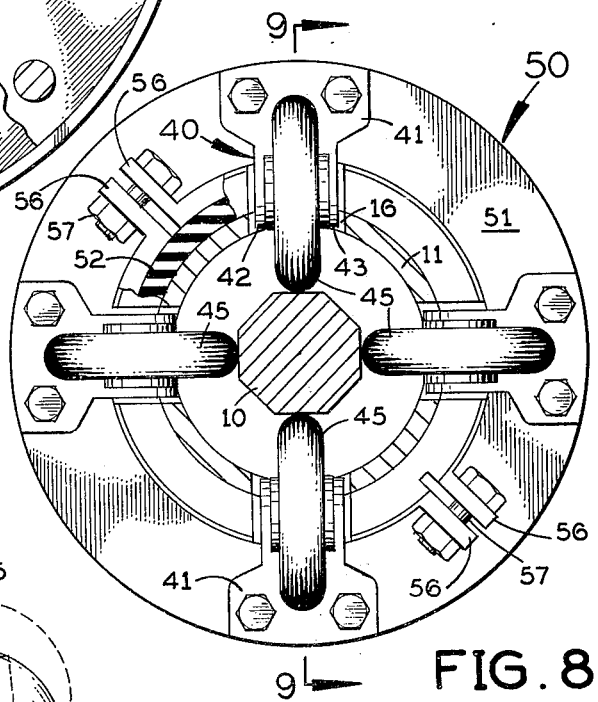
FIG. 8
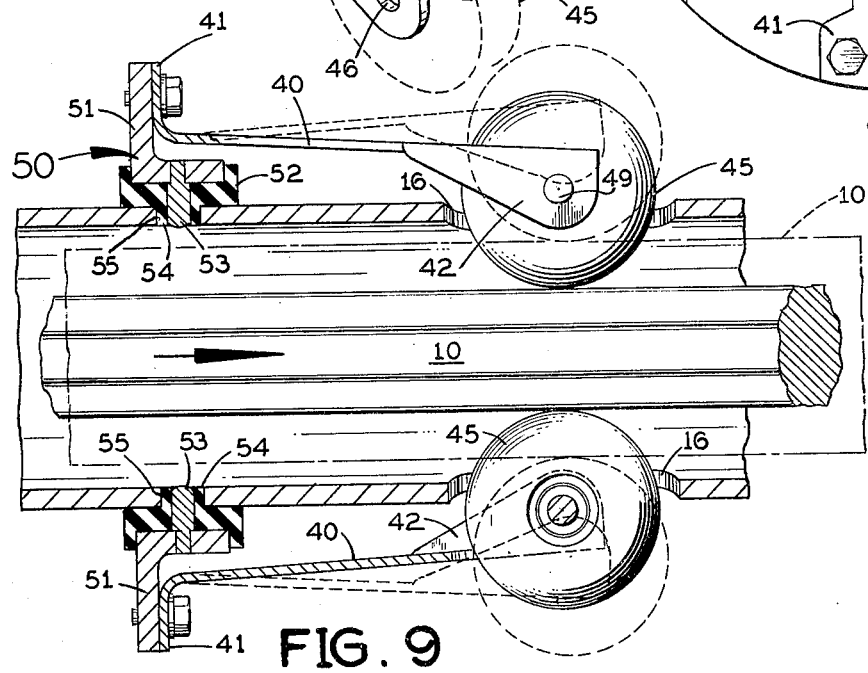
FIG. 10
FIG. 9
FIG. 11

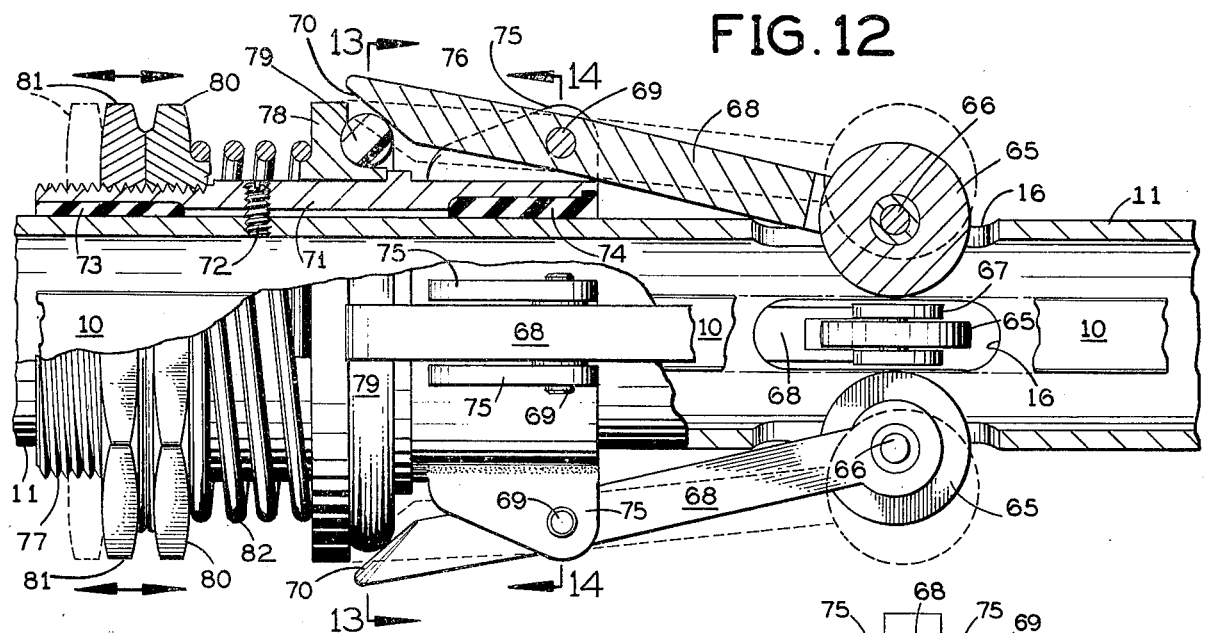
FIG. 12
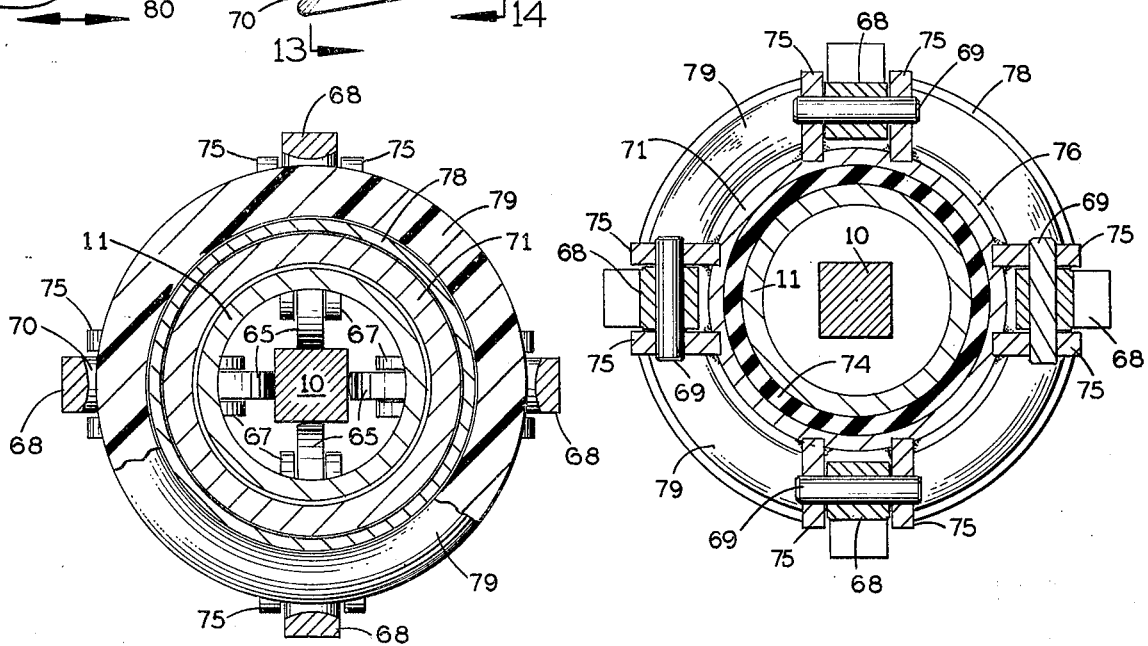
FIG. 13
FIG. 14

NOISE-ABSORBING BAR STOCK GUIDE FOR SCREW MACHINE

BACKGROUND OF THE INVENTION

In the operation of screw machines of known design, the bar stock has been fed into the machine in long lengths and this stock has had a very considerable tendency to vibrate transverse to its length. Usually the rotating bar stock was passed through an elongated guide tube held stationary at the inlet side of the screw machine. The rotating bar stock has a loose fit inside the non-rotating guide tube and it is free to vibrate transversely, striking the tube and thereby causing appreciable noise and often damaging the stock itself, particularly if it is of hexagonal or other polygonal, sharp cornered cross-section. Excessive noise in a machine shop is an occupational hazard which can be damaging to the safety, health and well-being of workers there, and it is contrary to federal policy, as expressed in the Occupational Safety and Health Act.

Various proposals for solving the noise problem, as disclosed in U.S. Pat. Nos. 1,506,107 and 1,506,108, 3,828,630 and 1,935,999, have included the use of mineral wool packing or the like inside the guide tube, rotatable bushings of leather, fiber, polyurethane or other suitable material inside the guide tube, and a metal coil inside the guide tube. Also, U.S. Pat. No. 3,785,468 provides circumferentially spaced metal rollers, mounted on right-angled metal brackets, for guiding bar stock inside a guide tube.

SUMMARY OF THE INVENTION

The present invention is directed to a novel bar stock guide arrangement for screw machines in which circumferentially spaced rollers project into bar stock passageway through the guide tube for guiding the bar stock between them. These rollers are mounted in a support which is yieldable and resilient to absorb the forces tending to displace the stock transverse to its length and for substantially deadening the noise which otherwise could be developed.

The advantageous effects of the present invention include the following:
1. noise elimination;
2. improved alignment of the bar stock with the chuck of the screw machine;
3. reduced wear on the spindle bearings, collet, collet tube, pushers, feed tubes and stock feeding mechanism of the machine;
4. elimination of excessive wear and damage to the bar stock as it is advanced through the guide tube;
5. easier feeding of the bar stock into the machine;
6. improved accuracy in the machining of the bar stock; and
7. reduced chatter.

The principal object of the present invention is to provide a novel bar stock guide arrangement for a screw machine which minimizes the transverse vibration of the stock at the inlet of the machine and greatly reduces the noise and the damage to the stock and to various parts of the machine that such vibration would cause.

Additional objects and advantages of this invention will be apparent from the following detailed description of several presently-preferred embodiments, which are illustrated in the accompanying drawings.

In the drawings:

FIG. 7 is an end elevation, with parts broken away, showing a stock guide similar to that of FIGS. 1–6 but with smaller rollers for engaging larger bar stock than in FIGS. 1–6.

FIG. 7a is a view similar to FIG. 7, but showing a three-roller stock guide having cylindrical rollers which are not grooved;

FIG. 8 is an end elevational view, with parts broken away, showing another embodiment of the present stock guide which has leaf springs carrying the guide rollers;

FIG. 9 is a longitudinal section taken along the line 9—9 in FIG. 8;

FIG. 10 is an enlarged perspective view of one of the leaf springs in the embodiment of the invention shown in FIGS. 8 and 9;

FIG. 11 is a perspective view, partly broken away, showing a modified form of roller for use in the present stock guide;

FIG. 12 is a longitudinal view, partly in elevation and partly in section, of another embodiment of the stock guide of the present invention;

FIG. 13 is a vertical cross-section taken along the line 13—13 in FIG. 12; and

FIG. 14 is a similar view taken along the line 14—14 in FIG. 12.

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

Figure 1:
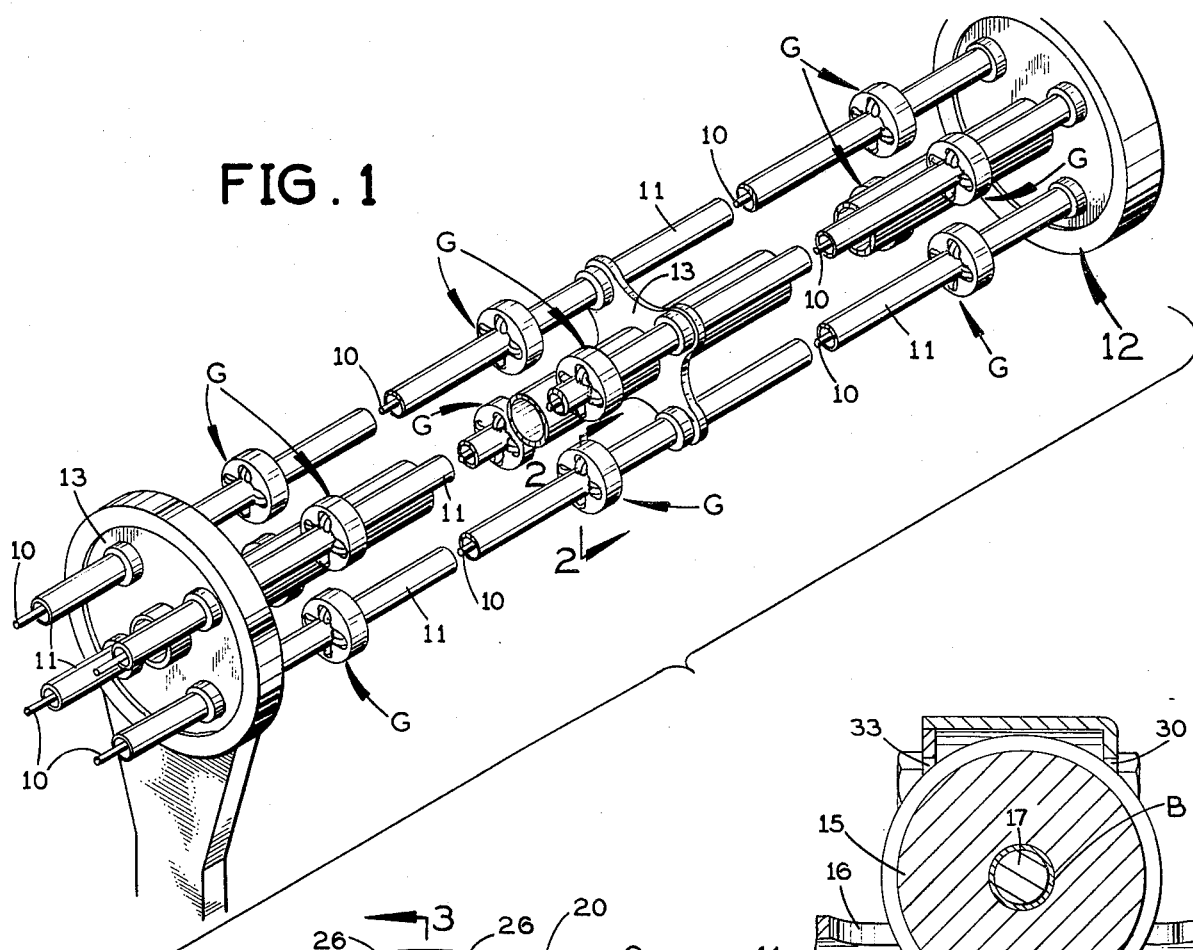
FIG. 1 is a perspective view showing several stock guide tubes provided with stock guides in accordance with a first embodiment of the present invention.

Referring first to FIG. 1, in a typical multiple screw machine, separate elongated bars of stock 10 pass loosely through respective elongated guide tubes 11 at the inlet side of the screw machine 12. These guide tubes extend parallel to each other and are rotatably supported at intervals in sleeve bearings carried by rigid cross plate 13, which may be fixedly supported in any suitable manner. As already mentioned, in prior machines, with the guide tube held stationary, when the bar stock is rotated its unsupported length vibrates transversely, banging against the inside of the respective non-rotating guide tube 11, thereby creating considerable noise and sometimes damaging the bar stock itself. In addition, this transverse vibration of the bar stock affects adversely the operation of the screw machine and has a tendency to cause undue wear on various parts of the screw machine.

In accordance with the present invention, a plurality of stock guides G are provided at appropriate intervals along the length of each guide tubes 11 and the guide tube rotates with the bar stock.

In the embodiment of FIGS. 1–6, each stock guide has four rollers 15 which are spaced apart circumferentially at 90 degree intervals. Each roller projects into the interior of the guide tube 11 through a respective longitudinal opening 16 formed in the latter, and the radially inward extremity of each roller is engaged tangentially by the bar stock 10. These rollers guide the bar stock between them and center it inside the guide tube 11.

Figure 2:
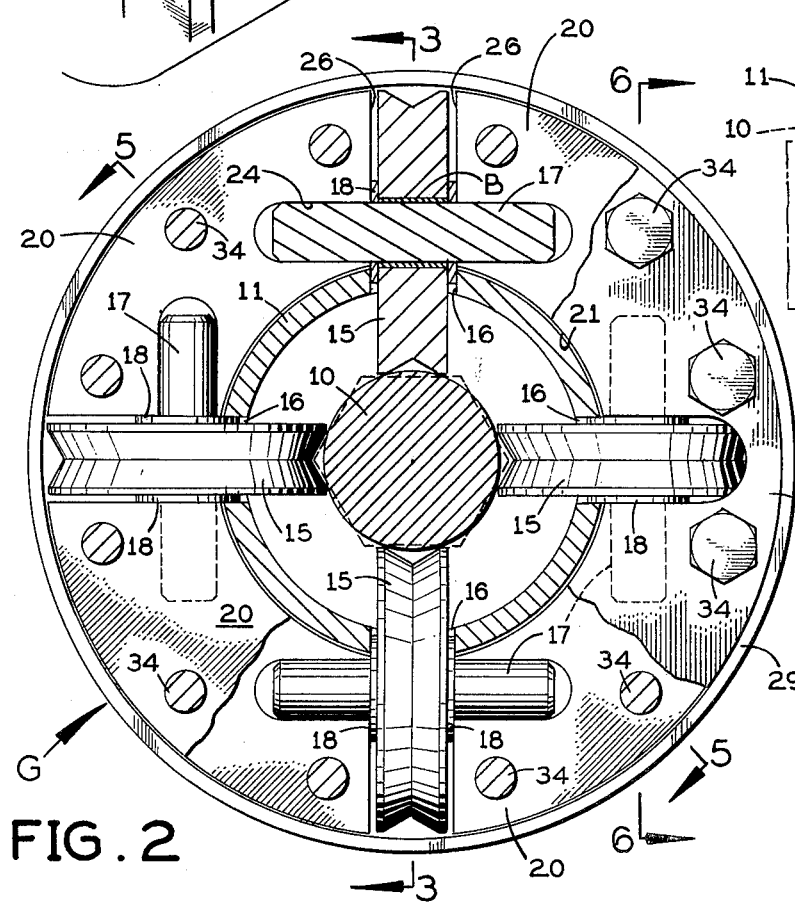
FIG. 2 is a vertical cross-section through one of these stock guides, taken along the line 2—2 in FIG. 1.
Figure 3:
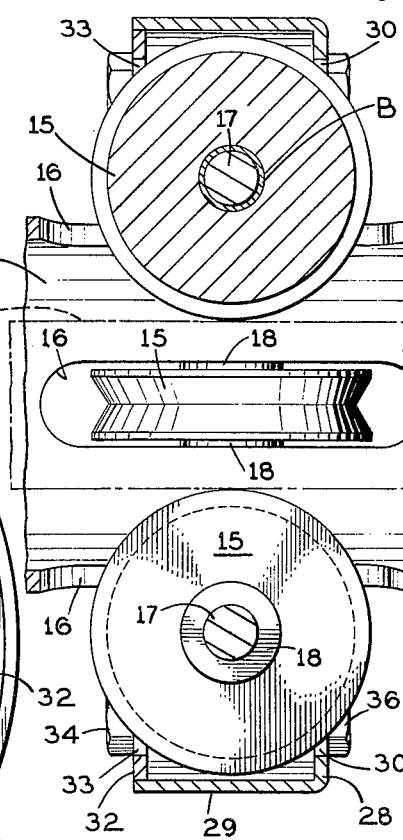
FIG. 3 is a longitudinal section taken along the line 3—3 in FIG. 2.

Preferably, these rollers have V-shaped peripheral grooves for snugly engaging cetain corners on hexagonal bar stock, as shown in dashed lines in FIG. 2.

Each roller 15 is mounted on a respective cross pin or axle 17 by means of an anti-friction sleeve bearing B (FIG. 2). A pair of flat, annular, metal washers 18 engage the opposite end faces of each roller. These washers extend snugly into the respective opening 16 in the guide tube 11 (as best seen in FIG. 2) and they center the corresponding roller 15 in this opening.

In accordance with an important aspect of this invention, the roller cross pins or axles 17 are mounted in yieldable, resilient supports of rubber or rubber-like material which absorb the transverse forces applied to the rollers 15 by the bar stock and substantially eliminate the noise that would otherwise be created as a result of these transverse forces.

Figure 4:
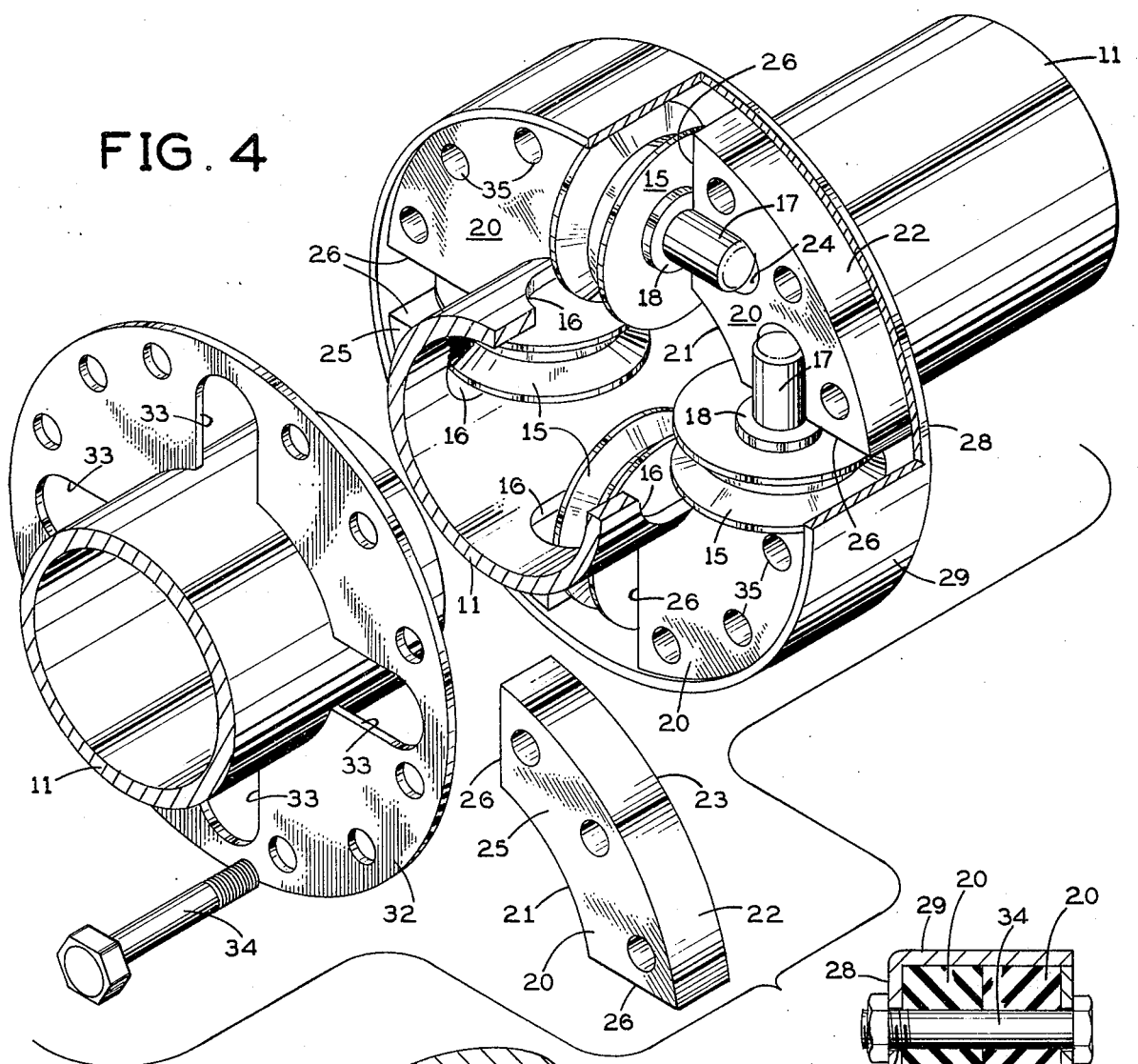
FIG. 4 is an exploded perspective view, with certain parts broken away for clarity, showing this stock guide on the guide tube.

In the preferred embodiment, each of these elastomeric supports is of arcuate configuration and is of two-piece construction, and the arcuate supports in each stock guide are arranged in a circle around the outside of the guide tube 11. Referring to FIG. 4, the removed piece 20 of one of the arcuate supports is a block of soft rubber having an arcuate inner peripheral surface 21 for snug engagement with the outside of the guide tube 11 and a concentric arcuate outer peripheral surface 22. This block has a flat, arcuate inside face 23 formed with grooves 24 of semicircular cross-section at opposite ends of the arc. Also, the block has a flat, arcuate outside face 25 and has respective flat end faces 26 at the opposite ends of its arcuate extent. Each end face 26 extends parallel to the adjacent end face of the nearest roller 15. Each groove 24 extends perpendicular to the adjacent end face 26.

The other half of the same arcuate support (shown in place in FIG. 4) is a mirror image of the block 20. When the two halves are assembled together (FIG. 6) with their inside faces 23 abutting against each other, the respective grooves 24 in the two halves are in aligned registration with each other and together they define circular recesses for snugly receiving the respective roller cross pins or axles 17.

In the embodiment of the invention shown in FIGS. 1–6 there are four such arcuate supports, each of two-piece construction, as described. Each arcuate support extends between a neighboring pair of rollers 15, and they snugly receive and support the roller axles or cross pins 17 so as to position and support the rollers 15 for rotation between them. In the complete assembly each roller 15 extends radially. The flat washers 18 are engaged between each roller and the end faces 26 of the adjacent elastomeric supports. Each pivot pin 17 extends perpendicular to, and is offset radially from, the conjoint longitudinal axes of the bar stock 10 and the guide tube 11.

Figure 5:
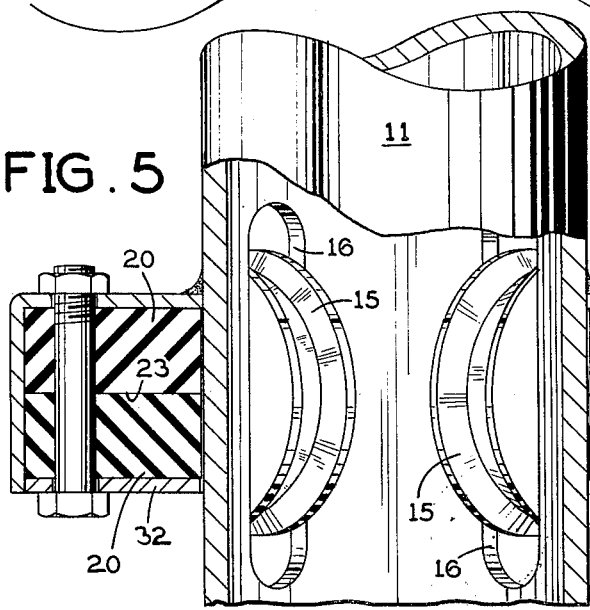
FIG. 5 is a longitudinal section taken along the line 5—5 in FIG. 2.
Figure 6:
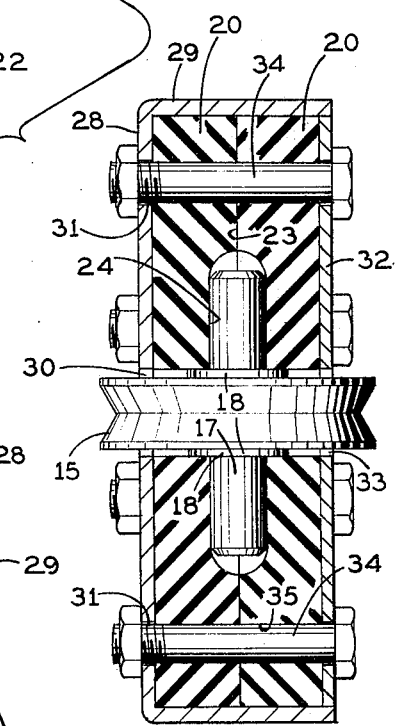
FIG. 6 is a longitudinal section taken along the line 6—6 in FIG. 2.
Figure 15:
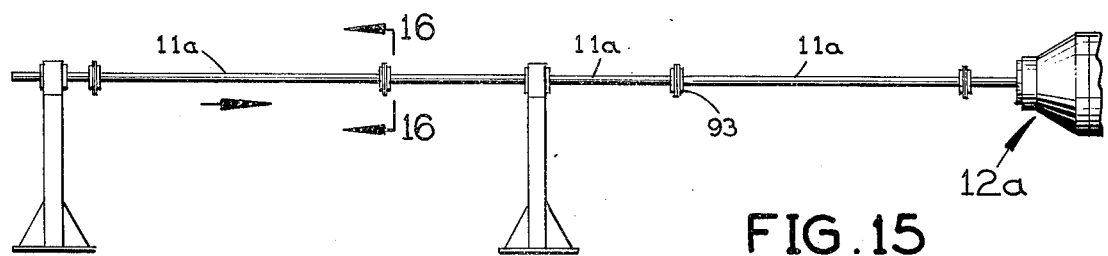
Figure 16:
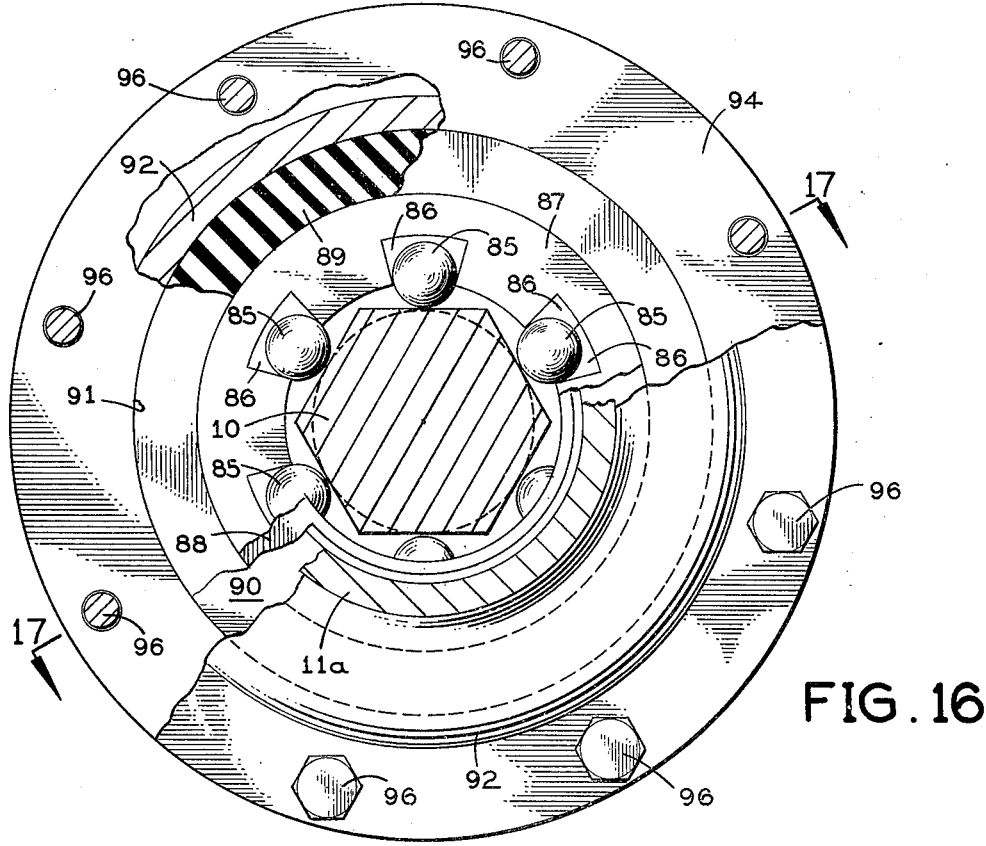
Figure 17:
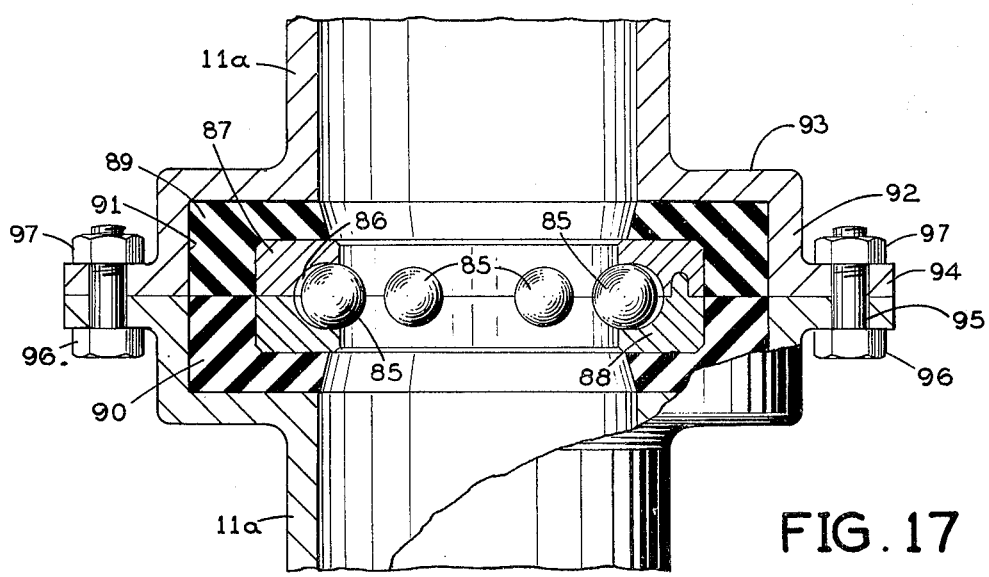

The stock guide has a two-piece housing which snugly receives the arcuate elastomeric supports for the rollers. One piece of this housing has a planar arcuate end wall 28 and a cylindrical peripheral wall 29 extending perpendicular to the end wall. The end wall has four radial slots 30 (FIG. 6) for passing the respective rollers 15, and it has several bolt holes 31. The other piece of the housing consists of a planar end wall 32 (FIG. 4) which fits snugly inside the cylindrical peripheral wall 29 of the first piece. This wall has four radial slots 33 for passing the rollers, and it has bolt holes for passing the shanks of bolts 34. The two-piece arcuate, elastomeric supports are held axially between the housing end walls 28 and 32, with the outer periphery 22 of each support piece fitting snugly inside the cylindrical peripheral wall 29 of the housing (FIGS. 5 and 6). The bolts 34 extend through openings in the housing end walls and corresponding openings 35 in the elastomeric supports, and nuts 36 are tightened on the ends of these bolts for clamping the entire assembly together as a unit.

FIG. 7 shows a slightly modified version of the just-described stock guide in which the guide rollers are of smaller diameter to accommodate bar stock of larger cross-section. In FIG. 7, elements of the stock guide which correspond to the elements in FIGS. 1–6 are given the same reference numerals, with a "prime" postcript added. The detailed description of these elements need not be repeated.

FIG. 7a shows a three-roller embodiment of the stock guide of FIGS. 1–6, with the rollers spaced apart circumferentially at 120 degree intervals. Each roller has a cylindrical (ungrooved) periphery. In other respects the stock guide is essentially similar to that of FIGS. 1–6, and the detailed description will not be repeated. In FIG. 7a, elements corresponding to those in FIGS. 1–6 have the same reference numerals, with a "double prime" postscript added.

FIGS. 8–10 show another embodiment of the present invention in which the guide rollers are yieldably and resiliently supported by cantilevered leaf springs.

Referring to FIG. 10, each leaf spring 40 has an outturned transverse mounting flange 41 at one end and is bifurcated at its opposite free end, presenting spaced, parallel, inwardly projecting legs 42, 43 on opposite sides of a longitudinal slot 44 which passes the respective roller 45. As shown, each roller has a rounded, convex profile at its periphery. However, it is to be understood that the roller may be cylindrical, as in FIG. 7a, or grooved, as in FIGS. 1–7, if desired. These legs are formed with aligned openings 46, 47 which receive the axle 48 (FIG. 9) of the respective roller. The rollers 45 extend through respective openings 16 in the guide tube 11 into the latter's longitudinal passageway for the bar stock 10.

A two-piece, annular, metal sleeve 50 extends around the stock guide tube 11 and presents a radially outwardly projecting arm 51 to which the mounting flanges 41 of the leaf springs 40 are bolted. Engaged between the inside of this split sleeve 50 and the outside of the guide tube 11 is an annular pad 52 of rubber-like material, which absorbs any vibrations that may be transmitted to the sleeve 50 from the rollers 45. The split sleeve 50 has radially disposed locating pins 53 which pass through annular projections 54 on the elastomeric pad 52 that are snugly received in corresponding openings 55 in the guide tube 11. These openings 55 are aligned (longitudinally of the guide tube) with the openings 16 in the guide tube which pass the respective rollers 45 on the free ends of the cantilevered leaf springs 40.

As shown in FIG. 8, the split sleeve 50 has opposite halves, each extending almost half-way around the elastomeric pad 52, and presenting confronting, apertured, radially outwardly projecting ears 56 at each arcuate end. Bolts 57 extend through the openings in the sets of confronting ears 56, and a nut 58 is threaded onto each bolt for clamping the opposite halves of the split sleeve 50 tightly around the elastomeric mounting pad 52.

Each leaf spring 40 is elongated longitudinally of the guide tube 11 and extends outside the latter circumferentially spaced from the other leaf springs. The guide rollers 45 are rotatable on the free ends of the respective leaf springs and they guide the bar stock between them in essentially the same fashion as the guide rollers in the previously disclosed embodiments. Transverse forces on the rollers 45 are absorbed by the individual leaf springs 40, which can flex outward in the manner indicated in phantom lines in FIG. 9 because of the cantilever mounting of these springs.

FIG. 11 shows a modified form of guide roller which may be substituted for the metal rollers already described. This roller is an annular metal body 60 having a tapered groove 61 in its periphery. A ring 62 of rubber, rubber-like, or synthetic plastic material is snugly seated in this groove and projects out radially beyond the periphery of the metal body 60 for engagement with the bar stock. The body 60 of the roller may carry a suitable anti-friction bearing 63 extending around a central axial opening therein. This type of roller may be used to minimize wear on the bar stock.

FIGS. 12-14 show another embodiment of the present invention in which the yieldable, resilient support for the guide rollers is provided by pivoted rigid arms, which carry the guide rollers at one end and at the opposite end are operatively coupled to a spring which is yieldable and resilient to accommodate outward transverse forces on the guide rollers.

Referring to FIG. 12, the guide rollers 65 are rotatably mounted on respective axles 66, each carried by a bifurcated end 67 of a corresponding, rigid arm 68. Each rigid arm 68 extends lengthwise along the guide tube 11 outside the latter and is pivoted on a cross pin 69 intermediate its length. The opposite end of each arm 68 has a tapered inside face 70, which is inclined outward and longitudinally away from the guide rollers 65.

A metal sleeve 71 is fastened to the guide tube 11 by a set screw 72 and extends loosely around the outside of the guide tube. Annular elastomeric pads 73 and 74 are engaged between the guide tube and this sleeve at its opposite ends.

At its right end in FIG. 12, the sleeve 71 presents radially outwardly projecting pairs of confronting ears 75, with the ears of each pair located on opposite sides of the respective pivoted arm 68 and carrying the latter's pivot pin 69. To the left of these sets of ears 75 in FIG. 12 the sleeve 71 presents an outwardly protruding, annular segment 76 located inside the inner ends of the tapered inside faces 70 on the pivoted arms 68. At its left end in FIG. 12 the sleeve 71 presents an externally screw-threaded segment 77. Between the screw-threaded segment 77 and the annular projection 76 the sleeve presents a cylindrical periphery.

A rigid, annular, metal plate 78 is slidably mounted on this cylindrical portion of the sleeve 71. This plate carries a ring 79 of suitable material, such as nylon or Teflon, for engaging the tapered inside faces 70 on the pivoted arms 68. The right end of plate 78 in FIG. 12 is engageable with the projection 76 on sleeve 71 to define a limit stop for plate 78 in which its ring 79 engages and spreads apart the left ends of the pivoted arms 68, thereby forcing the rollers 65 on the opposite ends of these arms inward the maximum extent.

Two nuts 80, 81 are threadedly mounted on the screw-threaded segment 77 of sleeve 71 to provide a longitudinally adjustable lock nut assembly. A coil spring 82 is engaged under compression between these lock nuts and the plate 78.

Normally, the spring 82 biases the plate 78 axially to the position shown in FIG. 12, forcing the pivoted arms 68 apart at this end and positioning the guide rollers 65 inward to engage the bar stock 10 between them. Any outward transverse forces on the rollers 65 are transmitted through the respective pivoted arms 68 and plate 78 to the yieldable and resilient coil spring 82, which absorbs these forces. The bias force normally exerted by the spring 82 on the assembly of the pivoted arms 68 and rollers 65 is adjustable selectively by adjusting the position of the lock nuts 80, 81 along the threaded segment 77 of sleeve 71.

In FIGS. 12-14 the bar stock 10 is shown as having a square cross-section, but it is to be understood that it may have any desired cross-section.

From the foregoing it will be evident that in each of the disclosed embodiments, the resilient yielding supports for the stock-guiding rollers are capable of absorbing substantially noiselessly the transverse forces produced in response to the tendency of the bar stock to vibrate transversely as it is fed into the machine.

I claim:

1. In a bar stock feeding arrangement for a screw machine which has an elongated guide tube defining a passageway at the inlet side of the machine for loosely receiving the bar stock, an improved bar stock guide comprising:
    a plurality of rollers spaced apart circumferentially around said passageway and each having an axle;
    and yieldable, resilient support means of rubber-like material with recesses therein which snugly receive the roller axles and positioning said rollers extending into said passageway for guiding the bar stock between them.

2. A feeding arrangement according to claim 1, wherein said support means of rubber-like material comprises a plurality of supports of said rubber-like material extending in succession circumferentially around said passageway between the rollers and each having a recess at each end snugly receiving the respective roller axle.

3. A feeding arrangement according to claim 2, wherein each of said supports or rubber-like material comprises opposite axial halves which have abutting inner faces extending perpendicular to the axis of said passageway and confronting, semi-cylindrical grooves in said inner faces which register with each other to define the recesses for receiving the respective roller axles.

4. In a bar stock feeding arrangement for a screw machine which has an elongated guide tube defining a passageway at the inlet side of the machine for loosely receiving the bar stock, an improved bar stock guide comprising:
    a plurality of rollers spaced apart circumferentially around said passageway;

and a plurality of leaf springs spaced apart circumferentially around the outside of said guide tube, each of said leaf springs being mounted at one end and carrying a respective roller at its opposite end, and each of said leaf springs extending longitudinally of the guide tube.

5. In a bar stock feeding arrangement for a screw machine which has an elongated guide tube defining a passageway at the inlet side of the machine for loosely receiving the bar stock, an improved bar stock guide comprising:

a plurality of rollers spaced apart circumferentially around said passageway;

a plurality of pivoted, rigid arms spaced apart circumferentially around said guide tube and carrying said rollers, each of said arms being pivoted intermediate its length and having one end thereof carrying the respective roller;

and yieldable, resilient means operatively coupled to said arms for biasing the rollers into said passageway in the guide tube, said biasing means forcing said arms outward from the guide tube at the opposite end thereof to position the rollers inward.

6. In a bar stock feeding arrangement for a screw machine, the combination of:

an elongated guide tube rotatable in unison with the bar stock at the inlet side of the machine and having a plurality of circumferentially spaced, longitudinal openings therein at the same location along its length;

and a stock guide on the tube at said location and comprising yieldable, resilient support means outside the tube and a plurality of circumferentially spaced rollers rotatably supported by said support means and respectively extending through said openings into the tube for guiding the bar stock between them.

7. The combination of claim 6, wherein:

each roller has an axle extending perpendicular to the axis of the guide tube at the outside of the latter;

and said support means comprises a plurality of supports of rubber-like material extending in succession circumferentially around the guide tube at said openings therein and each having a recess at each end snugly receiving the respective roller axle.

8. The combination of claim 6, wherein said support means comprises a plurality of leaf springs spaced apart circumferentially around the outside of said guide tube and extending longitudinally of the guide tube, each of said leaf springs being mounted at one end at a location spaced along the guide tube away from said openings therein and carrying a respective roller at its opposite end.

9. The combination of claim 6, wherein said support means comprises:

a plurality of rigid arms pivoted intermediate their respective ends and each carrying a respective roller at one end;

and means yieldably spreading apart the opposite ends of said arms to bias the respective rollers into the guide tube.

* * * * *